July 28, 1964

W. M. THOMAS 3,142,086

CASTER LOCK MECHANISM

Filed Oct. 17, 1961

INVENTOR.
WILLIAM M. THOMAS
BY
Elliott & Pastoriza
ATTORNEYS

July 28, 1964    W. M. THOMAS    3,142,086
CASTER LOCK MECHANISM

Filed Oct. 17, 1961    2 Sheets-Sheet 2

INVENTOR.
WILLIAM M. THOMAS
BY
*Elliott & Pastoriza*
ATTORNEYS

United States Patent Office 3,142,086
Patented July 28, 1964

3,142,086
CASTER LOCK MECHANISM
William M. Thomas, 654 S. Westlake Ave.,
Los Angeles 54, Calif.
Filed Oct. 17, 1961, Ser. No. 145,604
4 Claims. (Cl. 16—35)

This invention relates to an improved caster lock mechanism for temporarily locking casters against swiveling movement.

The preferred embodiment of the caster lock mechanism is incorporated on typewriter stands, and for purposes of a specific example, the invention will be described in this connection. It should be understood, however, that the principles of the invention are applicable to other structures employing casters.

Conventional typewriter stands having casters are usually provided with means for locking the casters against either rolling or swiveling movement, or both. In lieu of such means, the typewriter stand may include elevating means and substitute legs for the conventional casters, the mechanism itself simply serving the purpose of lifting the casters from the floor so that the typewriter stand rests on rigid substitute feet.

Both of the above systems are usually operated by a secretary's foot, and in many instances, individual operations are necessary for each of the casters involved. For secretaries wearing high heel shoes, the proper manipulation of the caster lock or elevating mechanism is not always a simple matter to perform. Further, in the case of elevating mechanisms, a considerable force is often required since the entire weight of the stand as well as the typewriter must be lifted.

Another serious consideration with respect to temporarily locking the casters of a typewriter stand or in lieu thereof providing substitute feet, relates to problems of vibration. In the event that the casters are rigidly locked or in the event that substitute feet are employed, the stand itself is relatively rigidly held with respect to the floor. As a consequence, throwing of the typewriter carriage will tend to establish flexure vibrations in the stand as a consequence of this rigidity. Such resulting vibrations are annoying to the typist and can result in typing errors.

With all of the foregoing in mind, it is a primary object of the present invention to provide a greatly improved caster lock mechanism which eliminates many of the foregoing problems.

More particularly, it is an object to provide a caster lock mechanism which may be manually operated by a girl for temporarily locking the casters to the end that foot pedals or other structure requiring operation by a person's foot are wholly avoided.

Another important object is to provide a manually operable caster lock mechanism in which the energy required to operate the same is wholly independent of the weight of the stand or any typewriter on the stand so that the operation itself is easy and simple to perform.

Another important object is to provide an improved caster lock mechanism which allows a certain play to exist in the casters which serves to absorb vibrations resulting from operation of the typewriter and thereby prevents the establishment of vibrations in the rigid structure of the typewriter stand itself.

Still another object is to provide a mechanism in which the casters need only be locked against swiveling movement to prevent lateral or sidewise movement of the stand so that forward and rearward motion of the typewriter stand can take place even while the casters are in their locked position. In conjunction with this object, it is also an object to provide in the same mechanism means whereby the rollers may also be locked, if desired.

Still other objects and advantages of this invention are to provide an improved caster lock mechanism which is rugged in construction, relatively inexpensive to manufacture, and which may readily be adapted to most present day typewriter stands without requiring expensive modifications thereof.

Briefly, these and many other objects and advantages of this invention are attained by providing a pair of slide bars in parallel relationship mounted for sliding movement with their opposite ends adjacent to the respective casters to be locked. Suitable caster engaging means are provided on the opposite ends of the slide bars such that when the slide bars are moved to a first position, the caster engaging means engage the casters to prevent swiveling movement thereof while still permitting a small amount of play to exist. When the slide bars are moved to a second position, the caster engaging means are simultaneously moved free of the casters to permit normal 360 degree swiveling.

The parallel slide bars themselves are operated by a unique coupling mechanism including a cross bar pivoted to mid-portions of the slide bars to define a general H-shape configuration. By simply moving the cross bar, both slide bars may be moved simultaneously. A manually operable actuating tube vertically mounted for rotation about its own axis to the typewriter frame structure in turn is employed for moving the cross bar. With this arrangement, there is provided a convenient manual means for operating the entire structure, foot pedals and the like being wholly unnecessary.

A better understanding of the invention will be had by now referring to the preferred embodiment thereof as illustrated in the accompanying drawings, in which.

Figure 1:
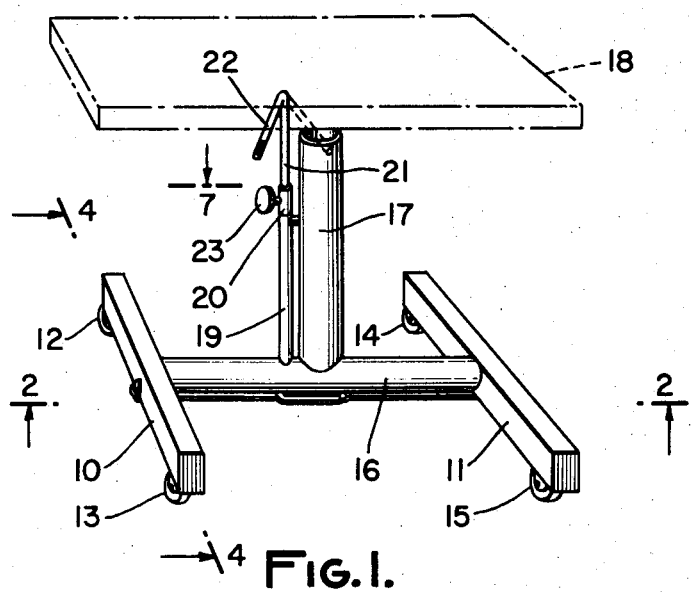
FIGURE 1 is an overall perspective view of a typewriter stand incorporating the improved caster lock mechanism of this invention, portions of the stand being shown in dotted lines for convenience of illustration.

Referring first to FIGURE 1, there is illustrated a typewriter stand including a pair of parallel horizontal frame members 10 and 11 provided adjacent their opposite ends with casters 12, 13, and 14, 15, respectively. As shown, a cross frame member 16 has its opposite ends connected to mid-portions of the frame members 10 and 11 to define a general H-shape. A vertical stand 17 in turn extends upwardly from the cross member 16 and may include an additional telescoping stand for supporting a typewriter table indicated in dotted lines at 18. Since the table and stand structure itself constitutes no part of the present invention, it is not described in detail.

In accordance with the present invention, there is provided a caster lock mechanism for locking the various casters 12–15 against swiveling movement. This structure includes a stationary sleeve 19 extending upwardly from the cross frame member 16 in parallel relationship to the stand 17. Within the sleeve 19 there is provided an actuating tube terminating in a top collar portion 20. This tube functions as a rotating tube and extends downwardly through the sleeve 19 to protrude out the lower end of the cross frame member 16 as will become clearer as the description proceeds.

Also provided is a handle means including a telescoping tube 21 having its lower end telescopically received within the actuating tube and its upper end terminating in a laterally bent portion 22 defining a handle. A suitable set screw means 23 is provided for locking the telescoping tube 22 to the bearing or swiveling actuating tube at its upper collar portion 20. With this arrangement, movement of the laterally bent handle 22 from the solid to the dotted line position will swivel the actuating tube within the sleeve 19 causing the lower end thereof to rotate through a small arc.

Figure 2:
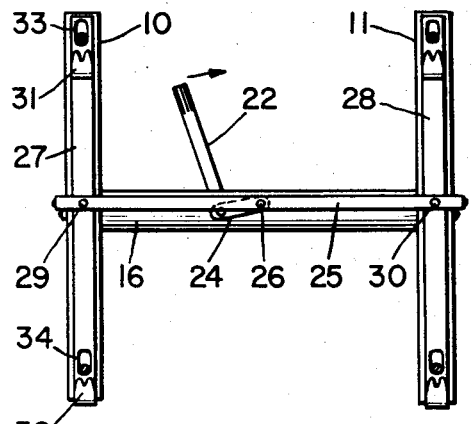
FIGURE 2 is a bottom view illustrating the caster lock mechanism in a first position taken generally in the direction of the arrows 2—2 of FIGURE 1.
Figure 3:
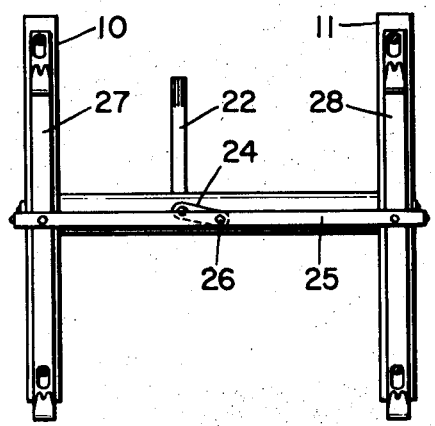
FIGURE 3 is a view similar to FIGURE 2, illustrating the caster lock mechanism in a second position.

With particular reference now to the bottom views of FIGURES 2 and 3, it will be noted that the lower end of the actuating tube is rigidly secured to one end of a lever member 24. A cross bar 25 in turn has an intermediate portion coupled to the other end of the lever member 24 as indicated at 26. The cross bar 25 runs beneath the cross frame member 16 and has its opposite ends pivoted to the mid-portions of a pair of parallel slide bars 27 and 28 as indicated at 29 and 30, respectively.

The slide bars 27 and 28 are identical to each other so that description of one will suffice for both. Thus, referring to the slide bar 27, the opposite ends thereof are provided with caster engaging means designated generally by the numerals 31 and 32. These opposite end portions also include elongated slots 33 and 34. The casters 13 and 12 shown in FIGURE 1 are omitted in FIGURE 2 to avoid obscuring other portions of the drawings. However, in the assembly of the device, the casters 13 and 12, respectively, are mounted through the slots 33 and 34 so that the casters themselves in being secured to the frame member 10 will hold the ends of the slide bar 27 against the under side of the frame member and yet permit sliding movement thereof as determined by the length of the guide slots 33 and 34.

In FIGURE 2, the various components including the cross bar 25 and slide bars 27 and 28 are shown in a first position in which the caster engaging portions 31 and 32 will engage the casters 13 and 12. Swinging movement of the handle 22 in the direction of the arrow shown in FIGURE 2 will result in a small arcuate movement of the rigid lever member 24 to move the cross bar 25 from the position shown in FIGURE 2 to that shown in FIGURE 3. This motion is in a direction generally parallel to the slide bars 27 and 28 and will result in movement of the slide bars 27 and 28 to the position illustrated in FIGURE 3. In this position, the caster engaging portions adjacent the ends of the slide bars are free of the casters. It will be immediately evident that movement of the handle 22 back to the position shown in FIGURE 2 will cause an arcuate swinging movement of the lever 24 to move the cross bar 25 upwardly as viewed in the drawings and thus move the slide bars 27 and 28 back to their first positions illustrated in FIGURE 2.

Figure 4:
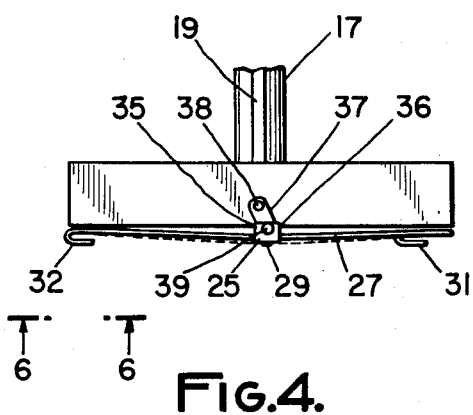
FIGURE 4 is a fragmentary side elevational view of a portion of the mechanism in its first position taken in the direction of the arrows 4—4 of FIGURE 1.
Figure 5:
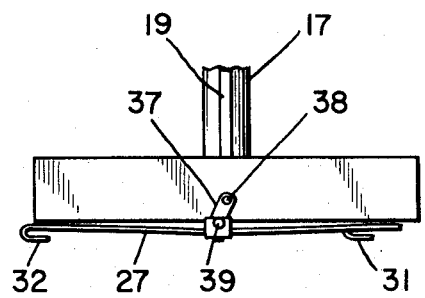
FIGURE 5 is a view similar to FIGURE 4 showing the same portions of the mechanism in a second position.

With particular reference to the side views of FIGURES 4 and 5, it will be noted that the opposite ends of the cross bar 25 terminate in upturned portions 35 and 36. Provided on the opposite sides of the frame members are overcenter links 37 having a first end pivoted at 38 to the exterior side of the frame member as shown and its other end pivoted or equivalently coupled between the upturned ends 35 and 36 as at 39.

The pivot 38 is on a line normal to the slide bar 27 when the slide bar is in an intermediate position, and the length of the link 37 is such that when the slide bar 27 moves from the position illustrated in FIGURES 2 and 4 to the position illustrated in FIGURES 3 and 5, a downward bowing of the bar is effected by the over-center link 37. The slide bars themselves are resilient so that this bowing action will result in a bias tending to hold the slide bar in the particular position to which it is moved. The bowed position is illustrated in dotted lines in FIGURE 4. This particular operation will be immediately evident by viewing FIGURES 4 and 5 together wherein in FIGURE 4 the slide bar is shown in its first position described in conjunction with FIGURE 2 whereas in FIGURE 5, the slide bar 27 is shown moved to its second position.

The other frame member 11 similarly includes on its outer surface a link corresponding to the link 37 coupled to the opposite upturned end of the cross bar 25.

Figure 6:
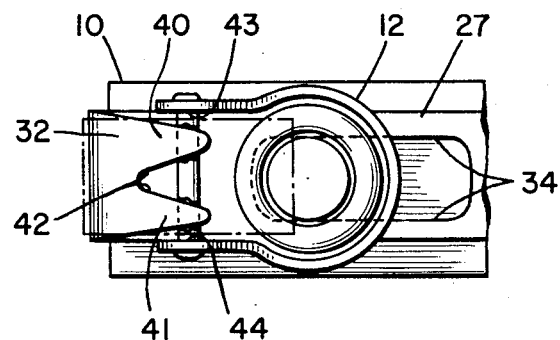
FIGURE 6 is an enlarged fragmentary bottom view of one of the caster engaging portions of the mechanism; and, FIGURE 7 is a cross section of a part of the actuating mechanism taken in the direction of the arrow 7 of FIGURE 1.

FIGURE 6 shows in greater detail the caster engaging portion 32 of the slide bar 27 adjacent the caster 12. As shown, this caster engaging portion includes a bifurcated structure defined by forks 40 and 41 defining a V-slot 42 therebetween. The forks 40 and 41 in turn are arranged to be received between sidewall portions 43 and 44 of the caster structure 12 when the slide bar 27 is in its first position as shown in FIGURE 6. It will be noted that the forks 40 and 41 taper inwardly slightly to provide a certain degree of swivel play between the sidewalls 43 and 44 before engagment with the fork structures. This small amount of play will permit the entire stand to move slightly and thereby absorb vibrations as a consequence of the returning carriage on a typewriter operating on the stand. In other words, by avoiding a rigid locking feature, flexure type vibrations are prevented from being established in the rigid structure of the stand itself.

The caster roller and shaft therefor are illustrated in dotted lines in FIGURE 6. It will be evident that the caster engaging bifurcated portions may be spaced sufficiently from the end surfaces of the slide bar 27 to cause the same to also engage the under side of the roller of the caster if desired so that the roller itself may be locked as well as swiveling movement of the caster prevented.

FIGURE 6 also illustrates clearly the manner in which the slot 31 receives the mounting for the caster 12. It will be clear that sliding movement of the bar 27 is limited by the ends of the slot 31 engaging the mounting structure for the caster 12. The slot, however, is sufficiently long to permit movement of the bifurcated portions 41 and 40 of the caster engaging means to free the caster 12 for complete 360 degree swiveling movement when the slide bar 27 is moved to its second position.

The forked portion for the caster engaging structure as described is desirable in that the V-portion itself may receive therein either the sidewall 43 or the sidewall 44 in the event the caster is slightly swiveled or not exactly aligned prior to operation of the locking mechanism. Thus, the caster may be locked in any one of three positions.

Figure 7:
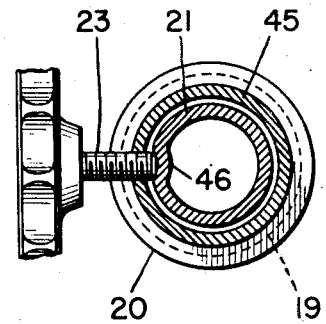

FIGURE 7 illustrates in greater detail the bearing and actuating tube structures described in conjunction with FIGURE 1. As shown, the collar 20 constitutes an enlarged external diameter portion of the bearing tube which is illustrated at 45 rotatable within the sleeve indicated by the dotted lines 19. The telescoping tube 21 in turn is telescopically received within the actuating tube 45 and is preferably provided with a longitudinal crimp defining a groove 46 for receiving the set screw 23. By this structure, relative vertical movement between the telescoping tube 21 and the actuating tube 45 is permitted so that the height of the handle 22 as illustrated in FIGURE 1 may be easily adjusted and then locked to the actuating tube to prevent relative rotation.

The operation of the caster lock mechanism will be evident from the foregoing description. Assume first that the cross bar and slide bars are in their second or unlocked positions as illustrated in FIGURES 3 and 5. In this position, the caster engaging portions are free of the casters themselves so that the caster rollers may rotate and the casters swivel in a conventional manner.

If now it is desired to lock the casters, the operator will pull the table towards her in a manner to cause the various casters 12, 13, 14, and 15 to align themselves with the frame members 10 and 11. When in such aligned position, the operator may then throw the handle 22 from the dotted line position shown in FIGURE 1 to the solid line position. This movement will cause the cross bar 25 as illustrated in FIGURE 3 to move up to the position illustrated in FIGURE 2 simultaneously thereby sliding the slide bars 27 and 28 from the second position shown in FIGURE 3 to the first positions shown in FIGURE 2.

With particular reference to FIGURE 6, it will be evident that as the slide bar 27 is moved as described, the caster engaging bifurcated portions 40 and 41 will be received between the sidewall portions 43 and 44 of the caster 12, thereby preventing swiveling of the same beyond a given degree to allow for the desirable play as described heretofore. The various other caster engaging portions operate in an identical manner to lock the other three casters of the structure.

In the event the caster engaging portions are so constructed as to not also lock the rollers of the casters, sufficient stability will still be realized since in a typewriter stand it is actually only necessary to lock the structure against lateral movement. This is because the movement of the typewriter carriage is in a lateral direction. On the other hand, if it is desirable to also lock the rollers, the locking mechanism of the caster engaging portions may be constructed as described to also engage the under side of the rollers as they are received between the sidewall portions of the casters.

In the movement of the slide bars 27 and 28 between the positions shown in FIGURE 3 to the positions shown in FIGURE 2, the over-centering link such as 37 as illustrated in FIGURE 5 will cause a bowing out of the slide bar so that the slide bar after passing a mid-point between the two positions will tend to bias itself to its first or locked position. This self-biasing feature as a consequence of the over-centering link and construction of the slide bars of resilient metallic material is desirable in that it provides a more or less snap type action thereby insuring a positive locking or freeing of the casters.

Because of the particular type of caster lock mechanim employed, it will be immediately evident that operation of the same is wholly independent of the weight of the stand or the weight of any typewriter on the stand. The operation of the device may thereby be effected with relatively little energy.

Finally, the telescoping feature for the handle 22 as described in conjunction with FIGURES 1 and 7 enables the height of the handle 22 to be adjusted in accordance with the height of the table 18 to be in a convenient position immediately beneath the table for operation by the secretary or other person using the stand.

While only one particular embodiment of the caster lock mechanism has been set forth and described. it will be appreciated that various modifications and substitution of equivalent elements may be effected without departing from the spirit and scope of the invention.

What is claimed is:

1. In a typewriter stand including a pair of horizontal frame members in spaced parallel relationship, a cross member having its ends connected to mid-portions of said frame members to define a general H-shape, four casters mounted to the under side of the end portions of said frame members, and a vertical stand member extending upwardly from the mid-portion of said cross member for supporting a typewriter table, a caster lock mechanism for locking said casters against swiveling movements beyond a given degree comprising, in combination: a sleeve member extending upwardly from said cross member in adjacent parallel relationship to said stand member; an actuating tube extending through said sleeve and having its lower end protrude from the under side of said cross member, the upper end of said actuating tube terminating in handle means for rotating said tube within said sleeve; a cross bar running beneath said cross member and terminating in ends adjacent the mid-portions of said frame members; an actuating lever having one end secured to said lower end of said actuating tube and its other end coupled to said cross bar such that rotation of said lever by said actuating tube moves said cross bar laterally from a first position in which its ends are closer to two of said casters at similar ends of said frame members to a second position in which its ends are closer to the other two casters at the opposite ends of said frame members; a pair of slide bars parallel to said frame members and having their mid-portions respectively coupled to said ends of said cross bar for movement along the under sides of said frame members between first and second positions upon movement of said cross bar, said slide bars having elongated guide slots in their ends through which said casters are mounted to hold said ends adjacent to said frame members and permit sliding movement thereof; and caster engaging means secured adjacent to the ends of said slide bars and positioned to engage said casters to lock the same against swiveling movement when said slide bars and cross bar are in said first positions and to be free of said casters when said slide bars and cross bar are moved to said second positions.

2. A caster lock mechanism according to claim 1, in which the ends of said cross bar terminate in upturned portions adjacent the exterior sides of said frame members; and over-center links pivoted between said exterior sides and said upturned portions respectively whereby said slide bars are caused to bow downwardly by said links when moving between said first and second positions, the resiliency of said slide bars thereby biasing said slide bars to stay in the positions to which they are moved.

3. A caster lock mechanism according to claim 2, in which said caster engaging means comprise bifurcated portions secured in spaced relationship to the ends of said slide bars to be received loosely between sidewall portions of said casters, whereby a swivel play within said given degree is provided when said slide bars are in said first positions for absorbing vibrational movements of said typewriter stand, said bifurcated portions being moved free of said sidewall portions when said slide bars are in said second positions whereby said casters are free to swivel over 360 degrees.

4. A caster lock mechanism for temporarily locking casters mounted to the underside of a frame structure against swiveling movement, comprising: a pair of parallel slide bars running beneath said frame structure and mounted for sliding movement thereto, said slide bars having caster engaging portions adjacent their opposite ends; a vertical actuating tube mounted to said frame structure for rotation about its own axis; a lever member having one end rigidly secured to the lower end of said tube; a cross-bar positioned normally to said parallel slide bars with its ends pivotably coupled to mid-portions of said slide bars to define a general H-shape, the free end of said lever member being coupled to an intermediate portion of said cross-bar whereby rotation of said actuating tube swings said lever to shift said cross-bar in a direction parallel to said slide bars to move said slide bars between first positions in which said caster engaging portions engage said casters to second positions in which said caster engaging portions are free of said casters; and over-center links having first ends pivoted to said frame structure and second ends pivoted to mid-portions of said slide bars, respectively, said first ends being pivoted on lines normal to said slide bars when said slide bars are intermediate said first and second positions to cause bowing of said slide bars by said links, said slide bars being resilient so that they will be biased to stay in the positions to which they are moved, each of said casters including sidewall portions, said caster engaging portions comprising bifurcated portions dimensioned to be received between said sidewall portions when said slide bars are moved to said first positions.

References Cited in the file of this patent

UNITED STATES PATENTS

| | | |
|---|---|---|
| 301,434 | Cyr | July 1, 1884 |
| 489,997 | Sweet | Jan. 17, 1893 |
| 1,633,638 | Jarvis et al. | June 28, 1927 |
| 2,088,236 | Faber | July 27, 1937 |
| 2,544,099 | Malin | Mar. 6, 1951 |